United States Patent [19]

Bowen

[11] Patent Number: 4,910,764

[45] Date of Patent: Mar. 20, 1990

[54] FACSIMILE AND VOICE COMMUNICATIONS INTERFACE DEVICE

[75] Inventor: James H. Bowen, Catharpin, Va.

[73] Assignee: Product Engineering & Manufacturing, Inc., Sterling, Va.

[21] Appl. No.: 337,480

[22] Filed: Apr. 13, 1989

[51] Int. Cl.[4] .......................................... H04M 11/00
[52] U.S. Cl. ...................................................... 379/100
[58] Field of Search ................................. 379/100, 373

[56] References Cited

U.S. PATENT DOCUMENTS

| | | | |
|---|---|---|---|
| 3,529,087 | 9/1970 | Kawase et al. | 179/2 |
| 3,746,790 | 7/1973 | Ault | 179/1 HF |
| 3,914,539 | 10/1975 | Hashimoto | 178/6 |
| 4,055,729 | 10/1977 | Vandling | 179/2 C |
| 4,306,116 | 12/1981 | McClure | 179/2 DP |
| 4,341,926 | 7/1982 | Chester | 179/2 C |
| 4,567,322 | 1/1986 | Tsuda | 179/2 A |
| 4,584,434 | 4/1986 | Hashimoto | 179/2 A |
| 4,596,021 | 6/1986 | Carter | 375/5 |
| 4,654,718 | 3/1987 | Sueyoshi | 358/257 |
| 4,656,655 | 4/1987 | Hashimoto | 379/105 |
| 4,658,417 | 4/1987 | Hashimoto et al. | 379/97 |
| 4,660,218 | 4/1987 | Hashimoto | 379/93 |
| 4,663,778 | 5/1987 | Takahashi | 379/100 |
| 4,677,660 | 6/1987 | Yoshida | 379/100 |
| 4,723,268 | 2/1988 | Newell et al. | 379/98 |
| 4,727,576 | 2/1988 | Yoshida | 379/100 |
| 4,773,080 | 9/1988 | Nakajima et al. | 375/5 |
| 4,782,512 | 11/1988 | Hutton | 379/88 |
| 4,821,312 | 4/1989 | Horton | 379/102 |

Primary Examiner—Stafford D. Schreyer
Attorney, Agent, or Firm—Whitham & Marhoefer

[57] ABSTRACT

An interface device allows a telephone ($P_1$) and a facsimile (F) to effectively share a common telephone line. When an incoming call is detected (10) a check is performed to determine if either the facsimile or telephone are off hook (12). The interface device connects the call and a local ringer (66) generates ringing signals (16) which are sent to the caller. While the rings are occurring, the interface device senses for a tone characteristic of a facsimile transmission (18). If a tone is detected, the call is connected (34) to the facsimile (F) with the local ringer (66) activating the facsimile (F). If a tone is not detected, the call is connected (22) to the phone ($P_1$) with the local ringer (66) alerting the called party that an incoming voice call has been received. When the call is completed (28), the interface unit is reset to receive another telephone call. If the call is never connected, i.e., if the caller hangs up, a dial tone sensor (78) detects for a dial tone on the telephone line. After a dial tone is detected, the local ringer (66) is deactivated and the interface unit is reset to receive another telephone call.

12 Claims, 2 Drawing Sheets

FACSIMILE AND VOICE COMMUNICATIONS INTERFACE DEVICE

BACKGROUND OF THE INVENTION

1. Field of the Invention

The present invention generally relates to a device which allows a single telephone line to be used for both facsimile and voice communications and, more particularly, to a device which automatically determine whether a facsimile transmission is being sent to the user's telephone station and, if not, allows the telephone call through to the user's telephone handset.

2. Description of the Prior Art

Facsimile equipment allows textual and graphical image data to be transmitted between users via telephone lines. Many users find the instantaneous transfer of data afforded by facsimile equipment preferable to overnight delivery mail services. A small firm may have a dedicated telephone line which handles facsimile transmissions as well as a telephone line used for business conversations; however, having an extra dedicated telephone line requires paying an additional monthly telephone service charge for that line. In the long term, the telephone service charges can be quiet expensive by comparison to the amount of facsimile transmissions the user sends or receives.

Small firms may prefer to use the same telephone line for both facsimile transmissions and business conversations. One problem encountered with using the same telephone line is that if the facsimile is set up to receive transmissions, business callers will not be able to get through to the user since the facsimile machine will answer the call expecting a facsimile transmission. Likewise, if the user decides to receive business calls, every time a facsimile transmission comes in, the user will hear a loud tone from the caller's facsimile machine and will be required to switch his facsimile machine on. Using a single line in the above-described fashion is not very satisfying since the small firm risks losing business callers and at the same time is not providing an efficient facsimile reception station.

U.S. Pat. No. 4,677,660 to Yoshida discloses a communication apparats which selectively allows voice communication or image communication on the same telephone line. In operation, an operator can send facsimile transmissions automatically or can dial numbers for voice communication by depressing a button on the phone. In the reception mode, a call is detected by a detector circuit. A CED signal (a called station identifying signal indicating that the called station is a non-voice communication terminal) is transmitted to the calling party when a ring is detected and a group identifying signal such as GI2 (for G2 facsimile equipment) or DIS (for G3 facsimile equipment) is transmitted to the calling party every three seconds for a period of twenty seconds. If the calling party is operating facsimile equipment, a GC2 or DCS signal will be sent in response to the group identifying signal and will establish communications between the two facsimile machines such that image data can automatically be received. If the calling party does not respond within the time period in which the group identifying signal is sent, it is assumed that the calling party is operating a voice communication terminal and an operator calling circuit is activated. The operator will then depress a button on the phone and can engage in a conversation with the calling party.

One problem with the Yoshida device is that it is not as automatic as one would like. A caller will be subjected to waiting up to twenty seconds before the Yoshida device decides that the calling party desires voice communication rather than facsimile communication. During this time interval, many callers may assume something is wrong with the operator's receiving station and simply hang up.

U.S. Pat. No. 4,584,434 to Hashimoto shows an automatic information reception terminal which receives voice and image information. In operation, a ringing signal from an incoming call is detected and an outgoing message is sent to the calling party. The calling party can leave his name or other information on a tape recording device and can remotely command the facsimile to receive information. When a remote command signal is issued by the caller pushing a button on his phone, a ringing signal generator is activated. The ringing signal generator produces telephone ring signal which is sensed by a ring signal detector that activates the facsimile for reception.

The Hashimoto device requires a remote control signal from the caller and a remote circuit must request a reset of the terminal. Therefore, the Hashimoto device is not fully automatic.

SUMMARY OF THE INVENTION

It is an object of this invention to provide a device which allows a single telephone line to be effectively used for facsimile transmissions and voice communications.

It is another object of this invention to provide a device which can connect a calling facsimile immediately to a receiving facsimile and can connect a calling person to a telephone receiver without the caller being aware of a facsimile transmission check.

According to the invention, an interface device is provided which allows a facsimile to effectively share the same telephone line as that used for voice communications. The interface device is equipped with appropriate tone decoders that sense tones which are characteristically produced by automatic facsimiles and tones which are produced by a sender's depression of selected touch tone buttons on the dialing phone of a manual facsimile. The interface device answers incoming telephone calls and checks for a tone signal characteristic of a facsimile transmission. If a facsimile tone signal is detected, the interface device connects the call to the receiving facsimile equipment. The receiving facsimile equipment is permitted to communicate directly with the transmitting facsimile equipment so that the receiving facsimile equipment can be automatically adjusted to the proper group identifying signal. If a facsimile tone signal is not detected, a ringing signal is generated at the telephone receiver to alert the user that an incoming business call is on the line. The user receives the call simply by picking up the telephone handset. The ring signals generated by the interface device are appropriately timed so that the caller thinks he has been received by a normal PBX type device. When the caller continues to hear a normal ringing sound he is more likely to stay on the line.

BRIEF DESCRIPTION OF THE DRAWINGS

The foregoing and other objects, aspects and advantages of the invention will be better understood from the following detailed description of the preferred embodiments of the invention with reference to the accompanying drawings, in which.

DETAILED DESCRIPTION OF THE PREFERRED EMBODIMENTS OF THE INVENTION

Figure 1:
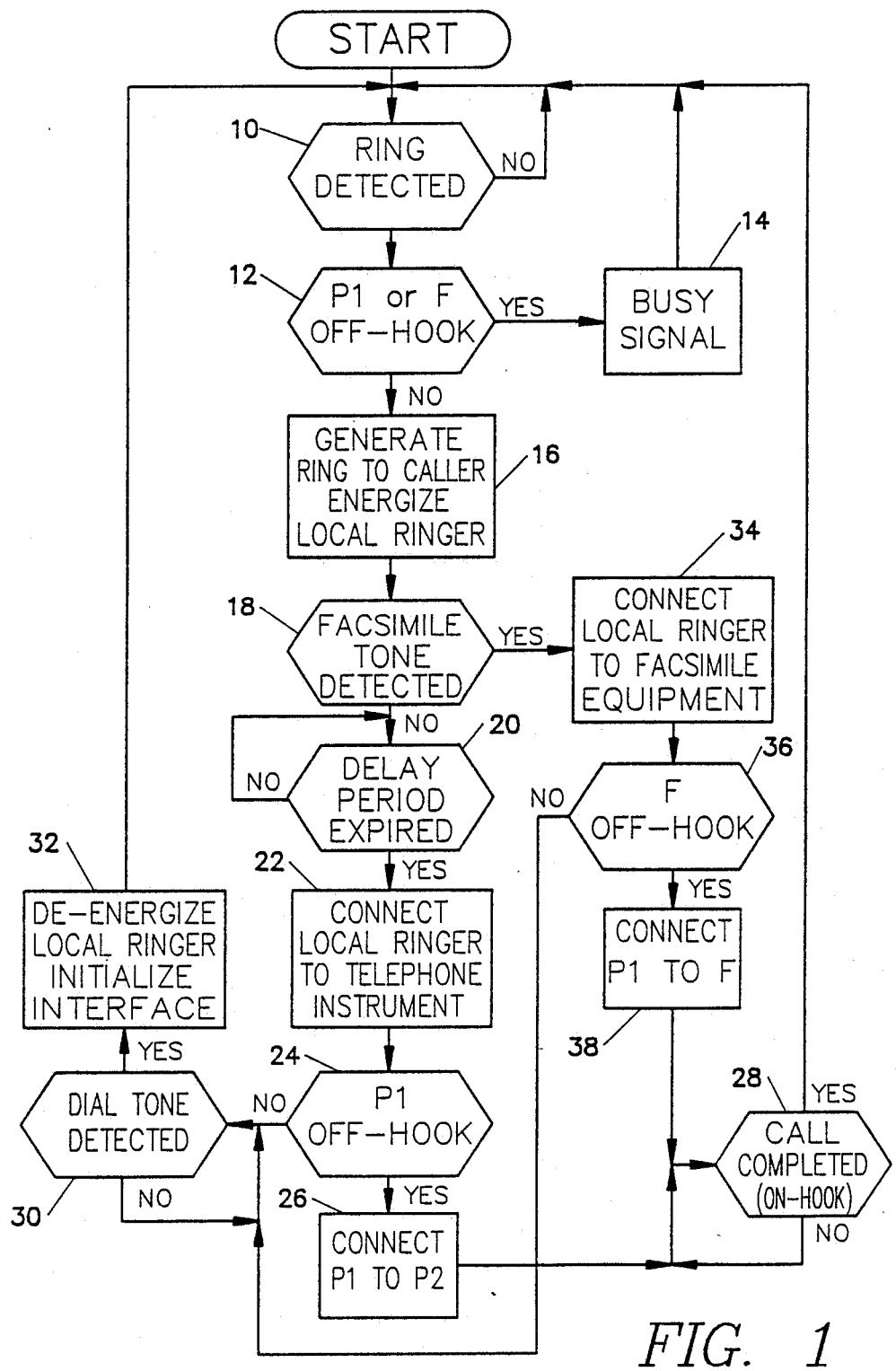
FIG. 1 is a flow chart showing the steps performed by the interface device for automatically connecting an incoming call to the facsimile or to the user's handset.

Referring now to the drawings, and more particularly to FIG. 1, there is shown a flow chart illustrating the logic of the operation of the interface circuit according to the invention. The process may be implemented in either software or hardware form. The process begins by testing the telephone line for a ringing signal in decision block 10. When a ringing signal is detected, a test is made in decision bock 12 to determine if either the telephone instrument connected to interface connection $P_1$ or the facsimile equipment connected to interface connection F are off-hook. If so, a busy signal is returned to the caller, as indicated by function block 14. This busy signal may be generated by the central telephone office.

Assuming that neither the telephone instrument nor the facsimile equipment are off-hook when a ring is detected, the interface equipment effectively "answers" the incoming call. When it does so, it generates a ring heard by the caller and energizes a local ringer, as indicated in function block 16. The interface circuit now tests, in decision block 18, for a tone on the line which is characteristic of a facsimile transmission (FAX tone). The FAX tone can be produced either automatically by the sending facsimile if it is operating in the automatic mode or semi-automatically by the sender depressing the 3, 6, 9, or # touch tone button on the sending facsimile's hand set if the sending facsimile is in the manual mode. If the FAX tone is not detected within a delay period as determined by decision block 20, the local ringer is connected to the telephone instrument in function block 22 to alert the called party that an incoming voice call has been received. The delay period for decision block 20 is adjustable and is preferably two or more rings. The purpose of the delay is to allow time for connecting the call to the user's facsimile equipment if the incoming call is a facsimile transmission.

In the case where the local ringer has been connected to the telephone instrument, a test is next made in decision block 24 to determine if the telephone instrument has gone off-hook, indicating that the called party has answered the call by lifting the handset. When the off-hook condition is detected, the telephone instrument is connected to the incoming telephone call in function block 26. The end of the call is detected in decision block 28 when the called party's handset is placed back on-hook. The end of call returns the interconnection circuit to its initial condition, awaiting a ring in decision block 10.

Should the called party not answer the call by lifting the handset of the telephone instrument, the caller will eventually hang up producing a dial tone on the line. This is detected in decision block 30. When the dial tone is detected, the local ringer is de-energized and the interface circuit is initialized in function block 32 before returning the circuit to its initial condition, awaiting a ring in decision block 10.

Assume now that the incoming call is a facsimile transmission. In this case, the test in decision block 18 is positive, and the local ringer is immediately connected to the facsimile equipment in function block 34. A test is then made in decision block 36 for an off-hook condition of the facsimile equipment. Normally, this would occur within the delay period. If the equipment is out of service for any reason, as for example it is out of paper, it will not answer the incoming call. The time out at the calling facsimile equipment will occur causing it to hang up. The interface circuit according to the invention will detect this condition in decision block 30 and the local ringer will be de-energized in function block 32, as before, with the interface circuit returning to its initial condition. Alternatively, if the equipment is out of service, the interface device can be set up to give a busy signal back to the incoming caller. On the other hand, if the off-hook condition is detected within the time period for answering, the incoming call is connected to the facsimile equipment in function block 38. The completion of the transmission is detected in decision block 28, as before.

Figures 2, 2A:
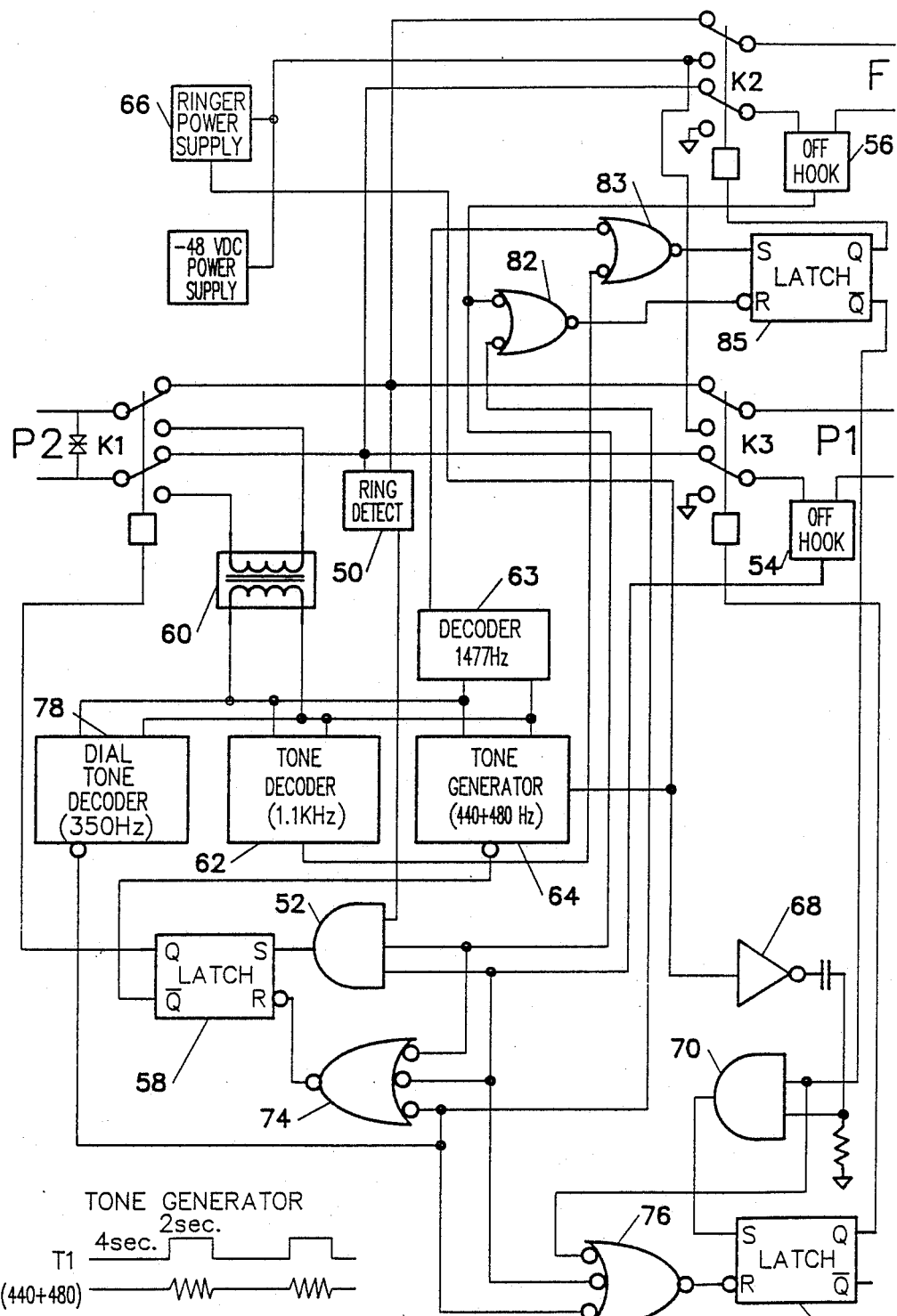
FIG. 2 is a schematic diagram of the circuitry used in the interface device.
FIG. 2a is a pulse signal produced by the tone generator for producing a ringing signal.

Referring now to FIG. 2, the circuit shown implements the process illustrated in the flow chart of FIG. 1. $P_2$ is the connection of the interface circuit to the telephone line, $P_1$ is the connection to the telephone instrument, and F is the connection to the facsimile equipment. The connections from $P_{22}$ to $P_1$ and F are made via relay $K_1$ and, respectively, $K_3$ and $K_2$. Relays $K_1$, $K_2$ and $K_3$ are double pole, double throw relays. The relays are shown in the figure in their initial positions.

The operation of the interface circuit will be described for the two cases for an incoming voice call and for an incoming facsimile transmission. In either case, an incoming call is detected by the ring detector 50 which provides an output that enables AND gate 52. The other two inputs to the AND gate 52 are supplied by the off-hook detectors 54 and 56. These respectively detect whether either the connected telephone instrument or the connected facsimile equipment are off-hook. Assuming that neither are off-hook, the output of the AND gate 52 rises to a logical "1" setting latch 58 raising the Q output of the latch to a logical "1" energizing relay $K_1$. This, in effect, "answers" the incoming call and connects the primary winding of transformer 60 across the interface connection $P_2$. The secondary winding of transformer 60 is connected to tone decoders 62 and 63 which check for a FAX tone indicating an incoming facsimile transmission.

Assume first that the incoming call is a voice transmission. In this case, no FAX tone is detected. The NOT Q output has enabled tone generator 64 which is also connected across the secondary winding of transformer 60. The tone generator 64 rings the caller with a period and frequency ringing signal as shown in FIG. 2A. That is, the ring signal pattern begins with a four second silence followed by a two second ring and repeating. Thus, even though the energization of relay $K_1$ "answers" the incoming call, the caller will nevertheless be presented with a ringing signal as if the call had been connected to a typical PBX device. The ringing signals are intended to encourage the caller to stay on the line.

The tone generator 64 also provides an output $T_1$ which enables a local ringer 66. The output $T_1$ is also supplied to a delay circuit 68 which has a time constant chosen to provide an output after a particular number of rings produced by the tone generator 64. Preferably, the delay circuit allows two rings which is approximately a 12 second delay. The delay period can be made adjustable to suit the needs of the user. The output of the delay circuit 68 causes the output of AND gate 70 to rise to a logical "1" setting latch 72. This in turn causes the Q output of latch 72 to rise to a logical "1" energizing relay $K_3$, connecting the interface connection $P_1$ to the local ringer circuit 66. The local ringer circuit 66 causes the telephone instrument to ring, alerting the called party of an incoming voice call.

The interface circuit now waits for an off-hook output from the off-hook detector 54, indicating that the called party has lifted the handset of the telephone instrument. When this occurs, the output of the off-hook detector drops to a logical "0" disabling AND gate 52 and resetting latch 58 via OR gate 74. When latch 58 is reset, relay $K_1$ is de-energized and the tone generator 64 is turned off. At the same time, latch 72 is reset via OR gate 76 thereby resetting relay $K_3$. This results in a direct connection between interface connections $P_1$ and $P_2$, as shown in FIG. 2.

Assuming, however, that no off-hook condition is detected indicating that the incoming call is not answered by the called party. In this case, the calling party will eventually hang up. This condition is detected by the dial tone decoder 78. The output of the dial tone decoder 78 resets latches 58 and 72 via OR gates 74 and 76, respectively, thereby returning the circuit to its initial condition shown in FIG. 2.

Assume now the case of an incoming facsimile call. If the sending facsimile is automatic, it will generally send a 1 KHz tone which is detected by tone decoder 62. If the sending facsimile is manual, the sender can send a 1447 Hz tone by depressing either the 3, 6, 9, or # touch tone button on the facsimile handset, with the 1447 Hz tone being detected by tone decoder 63. Other suitable tones may be generated by other means; for example, some facsimiles have a start key which upon depression sends a particular tone. It is to be noted that the specific frequencies of the tones transmitted may change and that appropriate tone decoders should be provided in the interface circuit. All tones transmitted over telephone lines are subject to telephone regulations. In any case, the tone which is detected is considered a FAX tone which is used to enable the facsimile for reception.

When a FAX tone is detected by either tone decoder 62 or 63, the output of either the tone decoder 62 or 63 rises to a logical "1", and latch 80 is set by the output of OR gate 83. This immediately connects the local ringer 66 to the facsimile equipment which will "answer" the call within two rings (can be varied) produced by tone generator 64. The circuit waits for the off-hook detector 56 to detect an off-hook condition produced by the facsimile equipment answering the incoming call. When this occurs, the off-hook detector output falls to a logical "0" which disables AND gate 52, resets latch 58 via OR gate 74, and resets latch 80 via OR gate 82. Both relays $K_1$ and $K_2$ are de-energized, providing a direct connection between interface connections $P_1$ and F. Should the facsimile equipment connected to connection F fail to answer the incoming call, the caller equipment will hang up within the delay period of delay 68. The tone detector 78 will detect the dial tone and reset latches 58 and 80 via OR gates 74 and 82, respectively.

The description thus far assumes incoming voice or facsimile calls. The interface connection circuit according to the invention is transparent to outgoing calls, whether voice or facsimile. In either case, an off-hook condition will be detected, but nothing will change because the AND gate 52 is prevented from setting latch 58. Each of the relays $K_1$, $K_2$ and $K_3$ will be in their deenergized states, with the connections between the interface connections $P_1$, $P_2$ and F remaining in the states shown in FIG. 2.

While the invention has been described in terms of its preferred embodiment where hardwired circuitry controls the operation of the interface unit, those skilled in the art will recognize that the same operation procedures could be performed by a semiconductor chip operating under the direction of appropriate software commands.

Having thus described my invention, which I claim and desire to secure by Letters Patent is the following:

1. An interface device for allowing facsimile equipment and telephone equipment to effectively share a common telephone line, comprising:
   telephone call receiving means for receiving telephone calls;
   tone detecting means for detecting the presence of a facsimile transmission signal on said common telephone line when a telephone call is received;
   facsimile equipment connecting means for connecting said telephone call to facsimile equipment if said tone detecting means detects a facsimile transmission signal;
   telephone connecting means for connecting said telephone call to a telephone if said tone detecting means does not detect a facsimile transmission signal; and
   a local ringer device which produces ringing signals which are returned to a caller over said common telephone line and which are sent to either said facsimile equipment or said telephone, said ringing signals are sent to said facsimile equipment if said tone detecting means senses the presence of a facsimile transmission signal, said ringing signals are sent to said telephone if said tone detecting means does not sense the presence of a facsimile transmission signal.

2. An interface device as recited in claim 1 further comprising a dial tone detecting means for detecting a dial tone on said common telephone line, said local ringer device being reset upon the detection of a dial tone.

3. An interface device as recited in claim 1 further comprising an end of call detecting means for detecting when said telephone call is completed, said end of call detecting means terminating a connection with said facsimile equipment or with said telephone at the completion of said telephone call.

4. An interface device as recited in claim 1 further comprising first and second off hook detectors for said facsimile equipment and said telephone, respectively, said first and second off hook detectors sensing when said telephone call can be received, said first off hook detector sensing when said telephone call can be connected to said facsimile equipment by said facsimile equipment connecting means, said second off hook detector sensing when said telephone call can be connected to said telephone by said telephone connecting means.

5. An interface device as recited in claim 1, further comprising a telephone ring detector for detecting the presence of said telephone call on said common telephone line.

6. A method of using a common telephone line to service both facsimile equipment and telephone equipment, comprising the steps of:
   detecting the presence of a telephone call from a caller;
   determining if said telephone call can be received by either facsimile equipment or telephone equipment, both of which are connected to said common telephone line by an interface unit which receives telephone calls;
   generating first and second ringing signals when a telephone call is received, said first ringing signal being returned to said caller;
   sensing for the presence of a facsimile transmission signal on said telephone line;
   connecting said telephone line to said facsimile equipment if a facsimile transmission signal is sensed on said telephone line, said second ringing signal activating said facsimile equipment for reception of said facsimile transmission signal; and
   connecting said telephone line to said telephone equipment if no facsimile transmission signal is sensed on said telephone line, said second ringing signal activating said telephone equipment for reception of said telephone call.

7. A method as recited in claim 6 further comprising the steps of sensing for the termination of said facsimile transmission or said telephone call, and disconnecting said connection between said telephone line and said facsimile equipment or said connection between said telephone line and said telephone equipment upon the termination of said telephone call.

8. A method as recited in claim 6 further comprising the steps of sensing for a dial tone on said telephone line, and de-energizing said local telephone ringer when a dial tone is sensed.

9. A method as recited in claim 6 wherein said determining step is performed by sensing if either said facsimile equipment or said telephone equipment is off-hook.

10. A method as recited in claim 6 wherein said generating and said sensing steps are performed simultaneously.

11. A method as recited in claim 6 wherein said facsimile transmission signal is sensed by sensing step is complete upon the generation of a variable number of ringing signals.

12. A method as recited in claim 6 wherein said facsimile transmission signal is sensed by detecting a one kilohertz signal on said telephone line.

* * * * *